United States Patent
Arkins et al.

[11] Patent Number: 6,116,782
[45] Date of Patent: Sep. 12, 2000

[54] EASY-ACCESS BEVERAGE POUCH

[75] Inventors: Thomas D. Arkins, Ridgefield, Conn.; Gary J. Albaum, Croton, N.Y.

[73] Assignee: Kraft Foods Inc., Northfield, Ill.

[21] Appl. No.: 09/194,642

[22] PCT Filed: Jun. 3, 1997

[86] PCT No.: PCT/US97/09442

§ 371 Date: Dec. 1, 1998

§ 102(e) Date: Dec. 1, 1998

[87] PCT Pub. No.: WO97/46459

PCT Pub. Date: Dec. 11, 1997

Related U.S. Application Data

[60] Provisional application No. 60/019,096, Jun. 3, 1996.

[51] Int. Cl.[7] ........................................ B65D 33/36
[52] U.S. Cl. .................. 383/202; 229/103.1; 493/212
[58] Field of Search .................. 383/200, 202; 229/103.1; 493/262, 264; 426/85

[56] References Cited

U.S. PATENT DOCUMENTS

| | | | |
|---|---|---|---|
| 3,909,582 | 9/1975 | Bowen | 219/121 |
| 4,553,693 | 11/1985 | Terajima et al. | 229/103.1 |
| 4,762,514 | 8/1988 | Yoshida et al. | 493/227 |
| 4,858,766 | 8/1989 | Tsai | 229/103.1 |
| 4,898,477 | 2/1990 | Cox et al. | 383/33 |
| 5,001,325 | 3/1991 | Huizinga | 219/121.69 |
| 5,054,684 | 10/1991 | Farber et al. | 229/103.1 |
| 5,201,459 | 4/1993 | Bettle, Jr. et al. | 229/103.1 |
| 5,201,460 | 4/1993 | Caines | 229/103.1 |
| 5,229,180 | 7/1993 | Littmann | 428/43 |
| 5,348,217 | 9/1994 | Bettle, Jr. et al. | 229/103.1 |
| 5,425,583 | 6/1995 | Wild | 383/202 |
| 5,463,200 | 10/1995 | Douglas et al. | 219/121.68 |
| 5,782,404 | 7/1998 | Robichaud et al. | 229/103.1 |
| 5,833,368 | 11/1998 | Kaufman | 383/202 |
| 5,873,656 | 2/1999 | Arkins et al. | 383/202 |
| 5,997,177 | 12/1999 | Kaufman | 383/202 |

*Primary Examiner*—Stephen P. Garbe
*Attorney, Agent, or Firm*—Thomas R. Savoie; Thomas A. Marcoux

[57] ABSTRACT

The invention relates to pouch or bag-shaped beverage containers (1) having an opening system which is pierced by a straw to access the beverage. The container includes a wall (14) which is a multilayer laminate which from the outside to the inside includes polyester film (3), printing ink (4), adhesive (5), foil (6), adhesive (7) and polyethylene film (8). In order to facilitate piercing of wall (14) by a straw, a portion of the outer polyester film is removed at an area (2) which is intended to be pierced by a straw as is known in the art. To further facilitate piercing of wall (14) an area of delamination (9) is created opposite area (2) between foil layer (6) and the polyethylene film (8). Area of delamination (9) is created by vaporizing adhesive layer (7) by means of laser radiant energy which is transmitted through the polyethylene film (8) and absorbed by adhesive layer (7).

9 Claims, 3 Drawing Sheets

EASY-ACCESS BEVERAGE POUCH

This application claims benefit of U.S. Provisional Application No. 60/019,096, filed Jun. 3, 1996.

FIELD OF THE INVENTION

The present invention relates generally to beverage containers which have an opening through which the beverage is consumed by means of a straw, and more particularly to a pouch or bag-shaped beverage container having an opening system which is pierced by a straw to access the beverage.

BACKGROUND OF THE INVENTION

In pouch or bag-shaped beverage containers having a membrane seal which is to be pierced by a straw, there is a problem making the seal sufficiently easy for the consumer to pierce. The piercing of the membrane seal may especially be a problem for small children who frequently utilize such containers and who lack the dexterity of adults.

The beverage pouches which are currently being marketed are fabricated from a laminated sheet material which is built up as follows from the outside to the inside: polyester film/printing ink/coating adhesive/metal foil/coating adhesive/heat-sealable plastic (e.g., polyethylene) film. Such a laminate is further described in U.S. Pat. No. 5,425,583 which is hereby incorporated by reference.

In the present commercial pouches, the outer polyester foil is removed within a straw piercing area so that the straw (typically a pointed straw) does not have to pierce the polyester film. Typically the straw piercing area is in the shape of a circle having a diameter in excess of the diameter of the straw. The straw piercing area has usually been removed from the polyester film before this film is laminated or adhered to the metal foil. To gain access to the pouch the straw must then only pierce the metal foil and adhered polyethylene film; however, this has still proven to be a difficult task.

Aforementioned U.S. Pat. No. 5,425,583 discloses an improved straw piercing opening wherein a hole is punched through all layers of the pouch laminate and a sealing film is affixed to the inner side of the polyethylene film around the straw piercing opening. Although this approach facilitates entry of the straw into the pouch, the added material and operational cost associated with this approach are not desirable.

SUMMARY OF THE INVENTION

According to the present invention, access to a pouch by a straw is facilitated by the application of laser energy to the inside surface of the laminate such that, within the straw piercing area, one or more areas of delamination are created between the inner polyethylene layer and the metal foil. If the pouch laminate contains an outer polyester film, the polyester film is preferably removed in the straw piercing area. This removal may be done, as in the prior art, by punching out a straw piercing area from the polyester film before this film is adhered to the metal foil; alternatively, the polyester film may be removed from the straw piercing area by laser treatment after the polyester film has been adhered to the metal foil.

The pouch laminate described in U.S. Pat. No. 5,425,583, which is exemplified by the sheet material used to fabricate CAPRI SUN® beverage pouches, typically uses polyethylene terephthalate as the polyester film and aluminum as the metal foil. The heat-sealable plastic film, may be any ethylene homopolymer or copolymer. The adhesive layers are generally polylefin-based, interlaminar bonding agents known for use as bonding layers in laminated structures. The composition and fabrication of these beverage pouch laminates are known in the art.

In order to effect delamination between the inner heat sealable plastic layer and the metal foil, laser energy is employed, whereby pulses of light energy are directed, or focused onto the laminate. The inner heat-sealable plastic layer must have a relatively lower absorption coefficient for laser radiant energy such that a high percentage (preferably at least 90%) of the radiant energy passes through this layer. In contrast the adhesive layer must have a relatively higher absorption coefficient for laser radiant energy such that a high percentage of the radiant energy is absorbed and transformed largely into heat. The adhesive layer may include such polymers as polyethylene terephthalate, polyvinyl alcohol or polyvinyl chloride to obtain the desired absorption coefficient. The laser energy is supplied in a desired pattern and with the appropriate intensity to cause localized heating and melting and vaporization of the adhesive layer. Desirably the generated heat also melts and vaporizes a portion of the plastic film layer adjacent the adhesive and promote crystallization of the polymers within the remaining plastic film layer.

Delamination of the plastic film layer from the metal foil has been found to greatly facilitate piercing of the pouch laminate by a straw. Also facilitating rupturing of the laminate in the fact that the plastic film will become crystallized in the area where laser energy is applied if sufficient heat is generated in these areas. Crystallization of the plastic film reduces the elongation and tensile strength of the film which also enables easier rupturing of the film by a straw. Any configuration or pattern of delamination within the straw piercing area may prove to be suitable. Thus, delamination may be effected in a single integral area or in spaced-apart areas. These spaced-apart areas could be spots, straight lines or curved lines.

BEST MODE OF THE INVENTION

Figure 1:
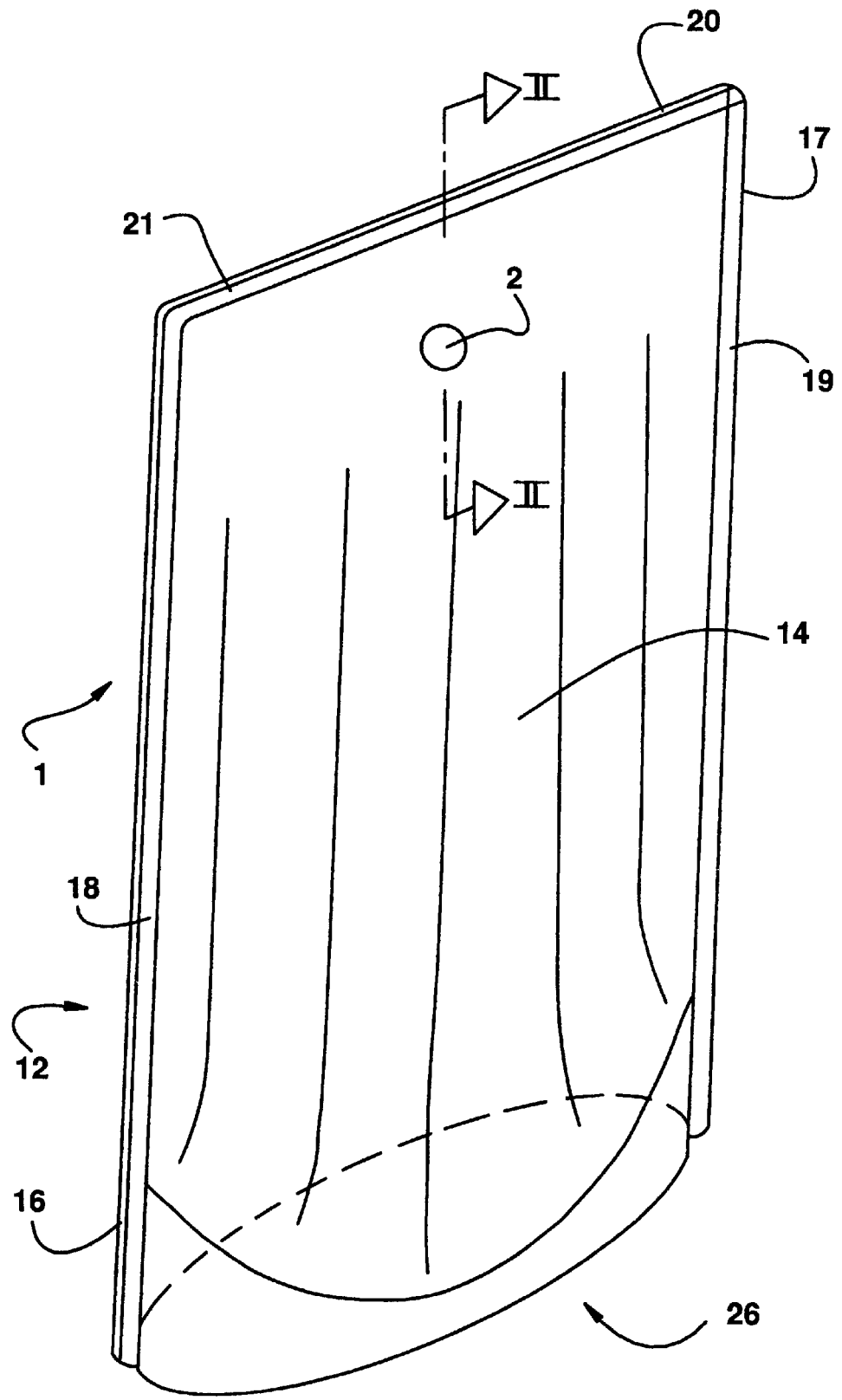
FIG. 1 shows a perspective view of a beverage pouch.

With reference to the drawings, FIG. 1 illustrates a flexible pouch of the present invention generally indicated as 1 that includes flexible front and back wall panels 12 and 14, respectively, which are superimposed over one another and sealed together (e.g., heat-sealed) along side peripheral edges 16 and 17 to form side seals 18 and 19, respectively, and along top peripheral edge 20 to form top seal 21. As is known in the art, as further described in U.S. Pat. No. 4,898,477 which is hereby incorporated by reference, the bag may be completed by means of a bottom gusset panel 26 which is attached to the inner surface of wall panels 12 and 14. A circular straw piercing area is indicated at 2, although this area may be formed in a variety of shapes.

Figure 2:
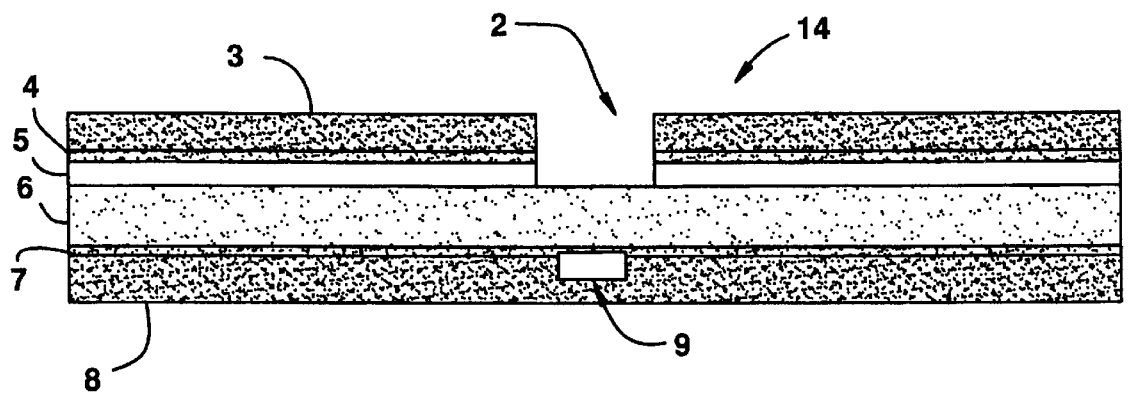
FIG. 2 shows a cross-sectional view of the pouch laminate through the front wall of the pouch along the view line II—II.

FIG. 2 shows a longitudinal section through the front wall 14 at a location which is slightly offset from the center of the straw piercing area. Wall 14 consists of a laminate which is as follows from the outside to the inside: polyester film 3 (about 12 microns)/printing ink 4/coating adhesive 5/aluminum foil 6 (about 12 microns)/coating adhesive 7/polyethylene film 8 (about 100 microns). Straw piercing area 2 is depicted by the absence of layers 3, 4 and 5. An area of delamination 9 (shown in cross-section) denotes the essential absence of adhesive layer 7 along with removal of a portion of polyethylene film 8.

Figure 3:
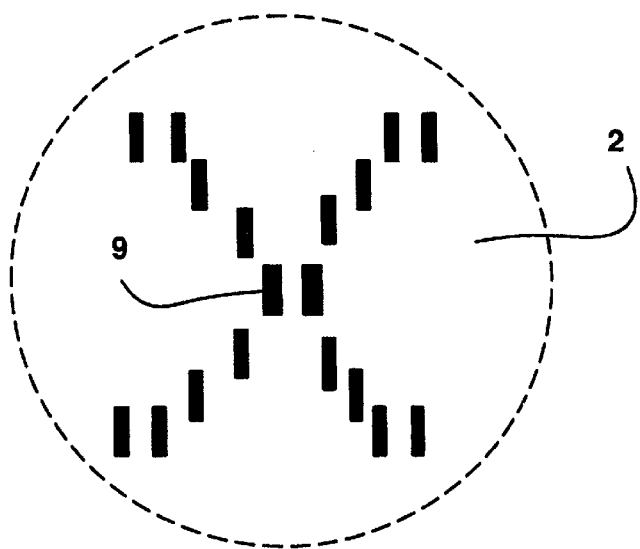
FIG. 3 shows an embodiment of areas of delamination within a circular straw piercing area, as viewed from the inside of the pouch.

FIG. 3 shows a pattern of spaced-apart areas of delamination 9, depicted as darkened areas substantially within the circular footprint of straw piercing area 2. These areas of delamination may be created by means of laser coding apparatus, such as the dot matrix laser coding equipment commercially available from Lumonics Corporation, Oxnard, Calif. under the XYMARK™ Sprint II brand name. This apparatus is able to convert a primary laser beam into a plurality of individual beamlets which may be focused on a moving workpiece, such as web material, in order to produce a desired pattern.

Figure 4:
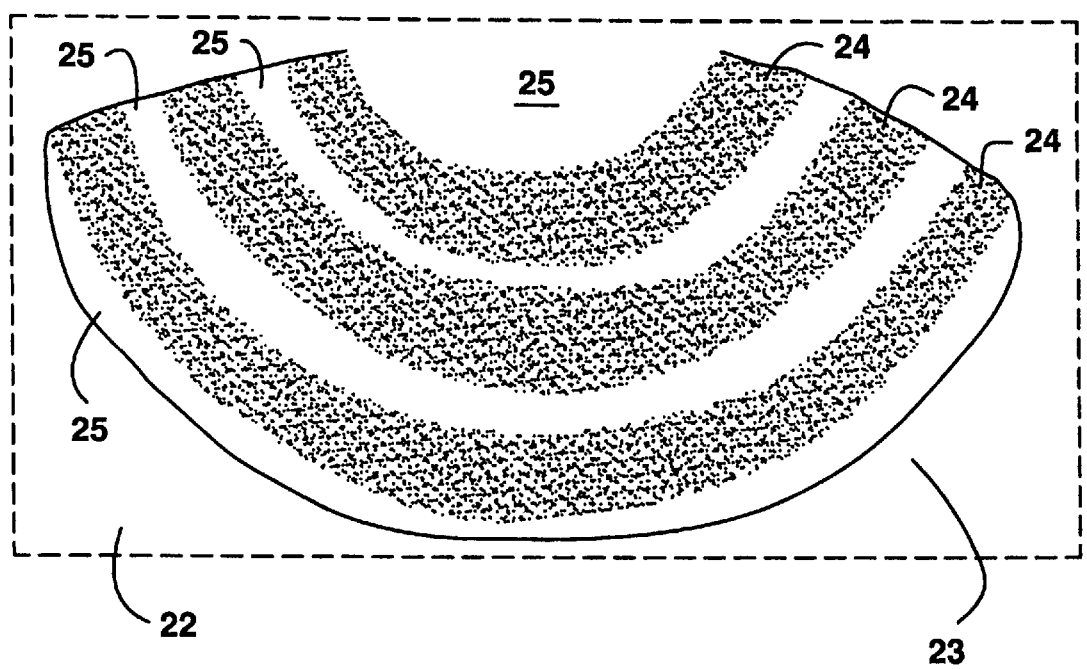
FIG. 4 shows an alternate, and preferred, embodiment of an integral area of delamination within a rectangular straw piercing area, as viewed from the inside of the pouch.

FIG. 4 depicts an arc shaped area of delamination 23 within the footprint of a rectangular straw piercing area 22. This area of delamination 23 results from delivering an intense pulse of laser energy in the image of the shaded areas 24. LaserMark® carbon-dioxide laser marking equipment systems, also available from Lumonics, is suitable for this purpose and have been found to be preferred for use in this invention. According to LaserMark® systems, a pulsed beam of light from a laser is used to illuminate a mask, the image of the mask is then demagnified onto the surface of the workpiece to produce the desired pattern. The mask contains curvilinear cut-out areas in the shape of shaded areas 24 and when laser energy impacts the laminate, adhesive layer 7 is vaporized within shaded areas 24 and polyethylene film 8 is crystallized within shaded areas 24. Due to the amount of heat generated by the laser, adhesive layer 7 will also melt within unshaded areas 25 resulting in essentially complete delamination within arc-shaped area 23.

The power of the laser coding equipment and the duration of the pulsed beam on the moving workpiece are readily adjusted to produce the desired amount of heat within adhesive layer 7 in order to create the desired pattern of delamination. Generally laser beam power is varied depending on the thickness of the laminate being worked. Use of laser beams having a delivered power of about 20 to 90 watts have proven useful in this invention. Radiant energy wavelengths of from about 9.4 to 10.6 microns have been successfully employed. Duration of the pulsed beam of from 15 to 30 microseconds is typical for use in this invention. Although primarily directed to forming a continuous line of weakness in a multilayer laminate, U.S. Pat. No. 3,790,744 discloses the use of a laser beam to preferentially vaporize at least one layer of a laminate which is not the most proximate layer in relation to the laser. The teachings of this patent are hereby incorporated by reference.

In order to precisely register areas of removed polyester film, as depicted in FIG. 1–3 as area 2 and in FIG. 4 as area 22 with the areas of delamination 9 and 23, it is desirable that laser energy also be utilized to remove the polyester film (and adjacent ink and adhesive layers). Typically the power level of the laser used to vaporize the polyester layer 3 will be greater than that used to create the aforementioned areas of delamination. The application of laser energy to both the inner surface and the outer surface of the laminated is preferably done at the same instant.

Having thus described the invention, what is claimed is:

1. In a beverage pouch made of a multi-layer laminate comprising a heat-sealable, plastic inner layer, which has a relatively lower absorption coefficient for laser radiant energy, adhered to the inner face of a metal foil layer by means of an adhesive layer, which has a relatively higher absorption coefficient for laser radiant energy, said pouch designed to be accessed by a straw that pierces the pouch at a designated area, characterized in that the pouch has one or more areas of delamination between the plastic inner layer and the metal foil layer within the designated straw piercing area in order to facilitate piecing of the multi-layer laminate by the straw.

2. The beverage pouch of claim 1 wherein the areas of delamination results from vaporization of the adhesive.

3. The beverage pouch of claim 2 wherein, within the areas of delamination, a portion of the plastic inner layer adjacent the adhesive is also vaporized.

4. The beverage pouch of claim 2 wherein there are spaced-apart areas of delamination.

5. The beverage pouch of claim 2 wherein the area of delamination is arc-shaped.

6. Method of treating web material for use in making beverage pouches designed to be accessed by a straw at a designated straw piercing area, said material being a laminate comprised of a heat-sealable, plastic inner layer, which has a relatively lower coefficient of absorption for laser radiant energy, adhered to the inner face of a metal foil layer by an adhesive layer, which has a relatively higher coefficient of absorption for laser radiant energy, wherein the improvement comprises the steps of: supplying laser energy to the inner face of the laminate within the straw piercing area such that one or more areas of delamination are created between the foil layer and the heat-sealable plastic layer; and fabricating a pouch using said web material.

7. The method of claim 6 wherein areas of delamination are spaced-apart.

8. The method of claim 6 wherein the area of delamination is arc-shaped.

9. The method of claim 6 wherein the laminate includes an outer polyester layer adhered to the outer surface of the metal foil layer by an adhesive layer and the polyester layer and the adjacent adhesive layer are removed within the straw piercing area by application of laser energy.

* * * * *